US006861107B2

(12) United States Patent
Klasen-Memmer et al.

(10) Patent No.: US 6,861,107 B2
(45) Date of Patent: Mar. 1, 2005

(54) LIQUID-CRYSTALLINE MEDIUM

(75) Inventors: Melanie Klasen-Memmer, Heuchelheim (DE); Dagmar Klement, Gross-Zimmern (DE); Matthias Bremer, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/611,854

(22) Filed: Jul. 3, 2003

(65) Prior Publication Data

US 2004/0011996 A1 Jan. 22, 2004

(30) Foreign Application Priority Data

Jul. 6, 2002 (DE) .......................... 102 30 597

(51) Int. Cl.$^7$ .................. C09K 19/52; C09K 19/30; C09K 19/12; C09K 19/38
(52) U.S. Cl. .............. 428/1.1; 252/299.63; 252/299.66; 252/299.01
(58) Field of Search .............. 428/1.1; 252/299.63, 252/299.66, 299.01

(56) References Cited

U.S. PATENT DOCUMENTS

| 5,543,075 | A | * | 8/1996 | Parri et al. ............. 252/299.01 |
| 5,942,157 | A | * | 8/1999 | Sutherland et al. ......... 252/582 |
| 6,514,580 | B2 | * | 2/2003 | Heckmeier et al. .......... 428/1.1 |
| 6,638,581 | B2 | * | 10/2003 | Heckmeier et al. .......... 428/1.1 |
| 6,699,407 | B1 | * | 3/2004 | Sutehrland et al. ......... 252/582 |
| 2001/0010366 | A1 | * | 8/2001 | Heckmeier et al. .... 252/299.63 |
| 2002/0084443 | A1 | * | 7/2002 | Heckmeier et al. .... 252/299.63 |

FOREIGN PATENT DOCUMENTS

| DE | 10107544 | * | 9/2001 |
| EP | 1106671 | * | 6/2001 |

* cited by examiner

*Primary Examiner*—Shean C. Wu
(74) *Attorney, Agent, or Firm*—Millen, White, Zelano & Branigan, P.C.

(57) ABSTRACT

The present invention relates to a liquid-crystalline medium based on a mixture of compounds of negative dielectric anisotropy comprising one or more polymerizable compounds, and to the use thereof for electro-optical purposes, and to displays containing this medium.

23 Claims, No Drawings

LIQUID-CRYSTALLINE MEDIUM

The present invention relates to a liquid-crystalline medium based on a mixture of compounds of negative dielectric anisotropy comprising one or more polymerizable compounds, and to the use thereof for electro-optical purposes, and to displays containing this medium, in particular for displays based on the DAP (deformation of aligned phases), ECB (electrically controlled birefringence), CSH (color super homeotropic) or VA (vertically aligned) effect, such as, for example, MVA (multidomain vertically aligned) or PVA (patterned vertically aligned) effect.

The principle of electrically controlled birefringence, the ECB or DAP ("deformation of aligned phases") effect, was described for the first time in 1971 (M. F. Schieckel and K. Fahrenschon, "Deformation of nematic liquid crystals with vertical orientation in electrical fields," Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio of the elastic constants $K_{33}/K_{11}$, high values for the optical anisotropy $\Delta n$ and values for the dielectric (DC) anisotropy $\Delta\epsilon$ of from about $-0.5$ to about $-5$ in order that they can be employed for high-information display elements based on the ECB effect. Electro-optical display elements based on the ECB effect have a homeotropic or vertical edge alignment, i.e. an alignment substantially perpendicular to the electrode surfaces, in the switched-off state.

More recent types of ECB display having a homeotropic edge alignment are those based on the CSH or VA (vertically aligned) effect, the latter also being known under the terms VAN (vertically aligned nematic) and VAC (vertically aligned cholesteric) effect. CSH displays are disclosed, inter alia, in H.Hirai, Japan Displays 89 Digest, 184 (1989), J. F. Clerc et al., Japan Displays 89 Digest, 188 (1989) and J. F. Clerc, SID 91 Digest, 758 (1991). VA displays have been described, inter alia, in S. Yamauchi et al., SID Digest of Technical Papers, pp. 378 ff. (1989), and VAC displays have been described in K. A. Crabdall et al., Appl. Phys. Lett. 65, 4 (1994).

Like the ECB displays which were already disclosed earlier, the more recent VA displays have a layer of a liquid-crystalline medium between two transparent electrodes, where the liquid-crystal medium has a negative value of the DC anisotropy $\Delta\epsilon$. The molecules of this liquid-crystal layer have a homeotropic or tilted homeotropic alignment in the switched-off state. Owing to the negative DC anisotropy, re-alignment of the liquid-crystal molecules parallel to the electrode surfaces takes place in the switched-on state.

In contrast to conventional ECB displays in which, in the switched-on state, the liquid-crystal molecules have a parallel alignment with a uniform preferential direction over the entire liquid-crystal cell, this uniform parallel alignment is in the VA and VAC displays usually only restricted to small domains within the cell. Between these domains, also known as tilt domains, disclinations exist.

As a consequence, VA displays have greater viewing-angle independence of the contrast and of the grey shades compared with conventional ECB displays. In addition, displays of this type are simpler to produce since additional treatment of the electrode surface, such as, for example, by rubbing, for uniform alignment of the molecules in the switched-on state is no longer necessary.

In contrast to VA displays, the liquid-crystal media in VAC displays additionally comprise one or more chiral compounds, such as, for example, chiral dopants, which, in the switched-on state, induce a helical twist of the liquid-crystal molecules in the liquid-crystal layer by an angle of between 0 and 360°. The twist angle here is preferably about 90°.

For displays having a vertical edge alignment, the use of compensators, such as, for example, optically uniaxially negative compensation films, has also been proposed in order to compensate for undesired light transparency of the display in the switched-off state at an inclined viewing angle.

It is also possible to control the preferential direction of the tilt angle by means of a special design of the electrodes without additional surface treatment of the electrodes, such as, for example, through an alignment layer, being necessary. A CSH display of this type is described, for example, in Yamamoto et al., SID 91 Digest, 762 (1991).

The above-described displays can be of the active-matrix or passive-matrix (multiplex) type. Thus, for example, ECB and VA displays operated as active-matrix or multiplex displays have been described, while CSH displays are usually operated as multiplex liquid-crystal (MLC) displays.

Although the above-described VA displays, in which liquid-crystalline media of negative dielectric anisotropy are used, have relatively short response times, there is a need for a further shortening, in particular of the grey-shade response times. On the liquid-crystal side, a contribution to this can principally be made by reducing the rotational viscosity of the LC mixtures.

A further problem in VA technology consists in achieving "controlled" switching in order to prevent the occurrence of interfering disclination lines. Special techniques are necessary for this purpose since the alignment layers used (for alignment of the LC molecules), which usually contain polyimides, mean that virtually no preferential alignment of the LC molecules (so-called pretilt) can be produced. For example, a certain pretilt is assigned to the molecules in so-called MVA mode by adding so-called protrusions in the cell, or the so-called fringe field effect is utilized, as, for example, in the PVA mode.

MVA displays are described, for example, in A. Takeda, S. Kataoka, T. Sasaki, H. Chida, H. Tsuda, K. Ohmuro, Y. Koike, T. Sasabayashi and K. Okamoto, "A Super-High-Image-Quality Multi-Domain Vertical Alignment LCD by New Rubbing-Less Technology", SID '98 Digest, pp. 1077–1080, (1998).

PVA displays are described, for example, in K. H. Kim, K. Lee, S. B. Park, J. K. Song, S. Kim and J. H. Souk, "Domain Divided Vertical Alignment Mode with Optimised Fringe Field Effect", Proceedings of the International Display Research Conference (Asia Display 1998), p. 38.

A new technique is described, for example, in EP 1 170 626 A2 or U.S. Pat. No. 5,963,290. Polymerization of polymerizable mesogenic or liquid-crystalline compounds, also known as reactive mesogens (RMs), which are added to the liquid-crystal mixture in small amounts enables a certain pretilt angle to be set.

However, it has been found that adequate optimisation of the electro-optical properties of VA displays is still impossible using the LC materials available hitherto.

There thus continues to be a great demand for MLC displays, in particular of the ECB, VA, MVA, PVA and CSH type, having very high specific resistance at the same time as a large working temperature range, short response times, even at low temperatures, and low threshold voltage which facilitate a large number of grey shades, high contrast and a wide viewing angle, have low values for the voltage holding ratio (HR) after UV exposure and do not exhibit the above-described disadvantages, or only do so to a small extent.

The invention thus has an object of providing MLC displays which do not have the above-mentioned disadvantages, or only do so to a smaller extent, facilitate the setting of a pretilt angle and preferably at the same time have very high specific resistances, low threshold voltages and short response times.

Upon further study of the specification and appended claims, further objects and advantages of this invention will become apparent to those skilled in the art.

It has now been found that these and other objects can be achieved if media according to the invention are used in LC displays.

The invention thus relates to a liquid-crystalline medium based on a mixture of polar compounds of negative dielectric anisotropy, characterized in that it comprises
one or more compounds of the formula I

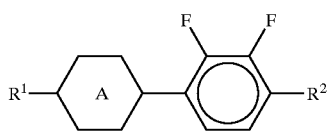

I one or more compounds of the formula II

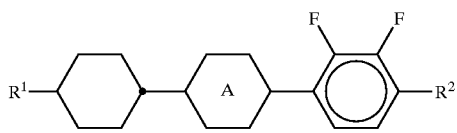

II and one or more polymerizable compounds,
in which
R¹ and R² are each, independently of one another, alkyl having from 1 to 12 carbon atoms, in which, in addition, one or two non-adjacent CH₂ groups may be replaced by —O—, —CH=CH—, —CO—, —OCO— or —COO— in such a way that O atoms are not linked directly to one another, and

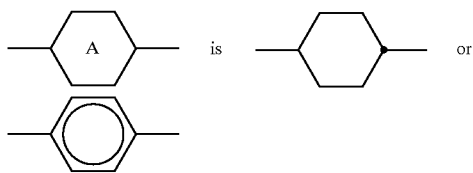

The invention furthermore relates to an electro-optical display having active-matrix addressing, in particular a display based on the DAP, ECB, VA, MVA, PVA or CSH effect, characterized in that it contains, as dielectric, a liquid-crystalline medium as described herein.

In the compounds of the formulae I and II, R¹ is preferably straight-chain alkyl having from 1 to 8 carbon atoms, particularly preferably methyl, ethyl, n-propyl, n-butyl or n-pentyl. R² is preferably straight-chain alkyl or alkoxy having from 1 to 8 carbon atoms, particularly preferably methoxy, ethoxy, n-propoxy or n-butoxy.

The compounds of the formulae I and II are preferably selected from the following formulae:

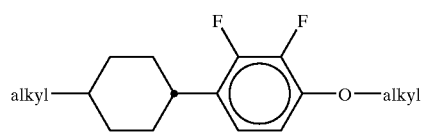

Ia

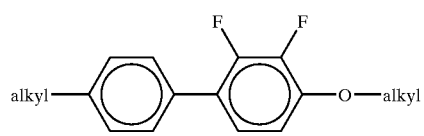

Ib

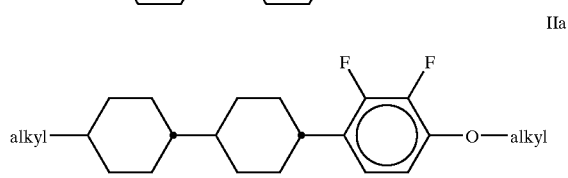

IIa

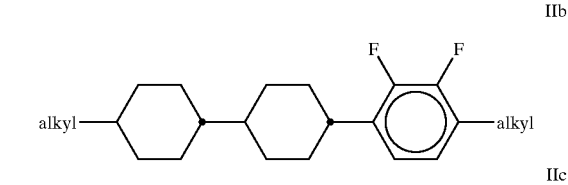

IIb

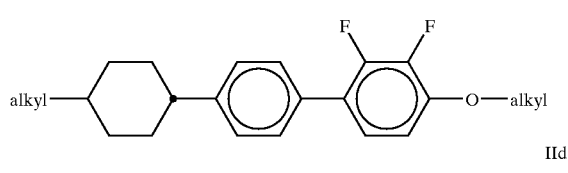

IIc

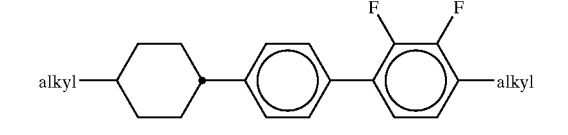

IId

in which alkyl is $C_{1-6}$-alkyl.

The polymerizable compounds are preferably reactive mesogens (RMs) selected from the formula I*:

$$P^1\text{-}Sp^1\text{-}X^1\text{-}A^1\text{-}(Z^1\text{-}A^2)_n\text{-}R \qquad I*$$

in which
R is H, F, Cl, CN, SCN, SF₅H, NO₂, straight-chain or branched alkyl having from 1 to 12 carbon atoms, in which, in addition, one or two non-adjacent CH₂ groups may be replaced by —O—, —S—, —CH=CH—, —CO—, —OCO—, —COO—, —O—COO—, —S—CO—, —CO—S— or —C≡C— in such a way that O and/or S atoms are not linked directly to one another, or is -X²-Sp²-P²,
P¹ and P² are each, independently of one another, a polymerizable group,
Sp¹ and Sp² are each, independently of one another, a spacer group or a single bond,
X¹ and X² are each, independently of one another, —O—, —S—, —OCH₂—, —CH₂O—, —CO—, —COO—, —OCO—, —OCO—O—, —CO—NR⁰—, —NR⁰—CO—, —OCH₂—, —CH₂O—, —SCH₂—, —CH₂S—, —CH=CH—COO—, —OOC—CH=CH— or a single bond,
A¹ and A² are each, independently of one another, 1,4-phenylene, in which, in addition, one or more CH groups may be replaced by N, 1,4-cyclohexylene, in which, in addition, one or more non-adjacent CH$_2$ groups may be replaced by O and/or S, 1,4-cyclohexenylene, 1,4-bicyclo[2.2.2]octylene, piperidine-1,4-diyl, naphthalene-2,6-diyl, decahydronaphthalene-2,6-diyl, 1,2,3,4-tetrahydronaphthalene-2,6-diyl or indane-2,5-diyl, where all these groups may be unsubstituted or monosubstituted or polysubstituted by L, L is preferably F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$ or OC$_2$F$_5$, particularly preferably F, Cl, CN, CH$_3$, C$_2$H$_5$, OCH$_3$, COCH$_3$ or OCF$_3$, in particular F, Cl, CH$_3$, OCH$_3$ or COCH$_3$.

Z is preferably —COO—, —OCO— or a single bond, furthermore CH$_2$, CH(CH$_3$) or C(CH$_3$)$_2$.

Particular preference is given to polymerizable compounds selected from the following formulae:

I*a

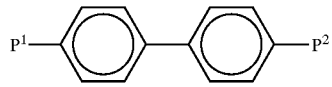

I*b

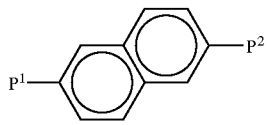

I*c

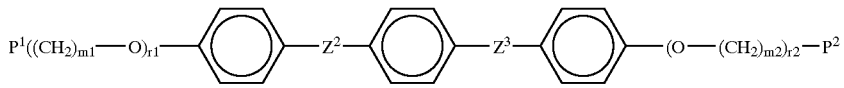

I*d

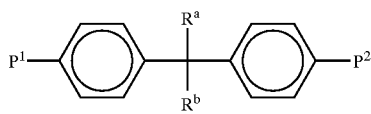

I*e

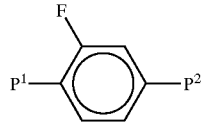

I*f

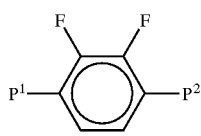

I*g

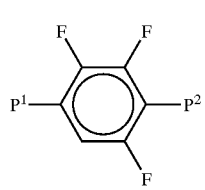

I*h

L is F, Cl, CN or alkyl, alkoxy, alkylcarbonyl, alkoxycarbonyl or alkylcarbonyloxy having from 1 to 7 carbon atoms, in which, in addition, one or more H atoms may be replaced by F or Cl, Z$^1$ is —O—, —S—, —CO—, —COO—, —OCO—, —O—COO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, —OCO—CH=CH—, CR$^0$R$^{00}$ or a single bond, R$^0$ and R$^{00}$ are each, independently of one another, H or alkyl having from 1 to 4 carbon atoms, and n is 0, 1 or 2.

R is preferably alkyl or alkoxy having from 1 to 12 carbon atoms or -X$^2$-Sp$^2$-P$^2$, particularly preferably -X$^2$-Sp$^2$-P$^2$.

P$^1$ and P$^2$ are preferably acrylate, methacrylate, vinyl, vinyloxy, propenyl ether or epoxy, particularly preferably acrylate or methacrylate.

Suitable spacer groups Sp$^1$ and Sp$^2$ are known to the person skilled in the art and are described in the literature. Sp$^1$ and Sp$^2$ are preferably straight-chain or branched alkylene having from 1 to 8 carbon atoms. Particular preference is given to compounds of the formula I* in which Sp$^1$-X$^1$ and Sp$^2$-X$^2$ are a single bond.

A$^1$ and A$^2$ are preferably 1,4-cyclohexylene, or 1,4-phenylene or naphthalene-2,6-diyl, each of which is unsubstituted or monosubstituted or polysubstituted by L.

in which P$^1$ and P$^2$ are as defined above and are preferably acrylate or methacrylate, Z$^2$ and Z$^3$ are each, independently of one another, as defined for Z$^1$ and are preferably —COO— or —OCO—, m1 and m2 are each, independently of one another, from 1 to 8, r1 and r2 are each, independently of one another, 0 or 1, preferably 0, and R$^a$ and R$^b$ are each, independently of one another, H or CH$_3$.

The phenyl rings in the formulae I*a to I*e may also be substituted by L, as defined above, in the 2-, 3- and/or 5-position.

Particular preference is given to compounds of the formulae I*a, I*b, I*c and I*e, in particular in which P$^1$ and P$^2$ are acrylate or methacrylate.

The polymerizable compounds are preferably polymerized by photopolymerization, for example by UV irradiation in the presence of a suitable initiator. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, or Darocure1173® (Ciba Geigy AG). The polymerizable compounds preferably comprise from 0.1 to 5% by weight, particularly preferably from 1 to 3% by weight, of one or more photoinitiators.

The combination of compounds of the formulae I and II with polymerizable compounds, in particular those of the formula I*, produces low threshold voltages, low rotational viscosities and very good low-temperature stabilities in the media according to the invention with still-high clearing points and high HR values, and enables the setting of a pretilt angle in VA displays. In particular, the LC media exhibit significantly shortened response times, in particular also the grey-shade response times, in VA displays compared with the media from the prior art.

Some preferred embodiments are mentioned below:

a) Medium which additionally comprises one or more compounds of the formula III:

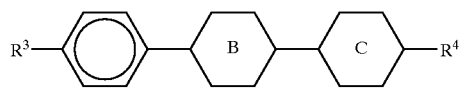

III in which $R^3$ and $R^4$ are each, independently of one another, as defined for $R^1$ in the formula I, and

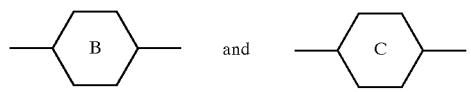

are each, independently of one another,

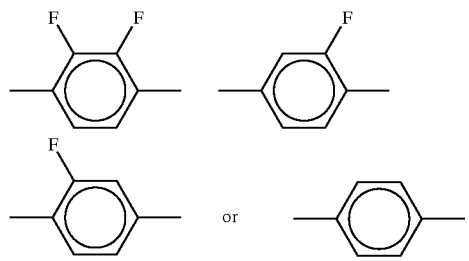

The compounds of the formula III are preferably selected from the following formulae:

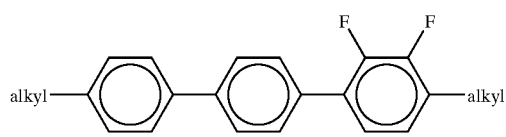

IIIa

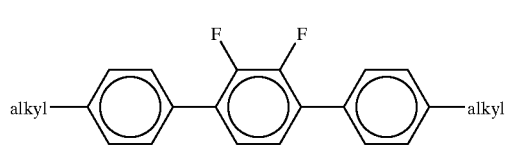

IIIb in which alkyl is $C_{1-6}$-alkyl.

b) Medium which additionally comprises one or more compounds of the formula IV:

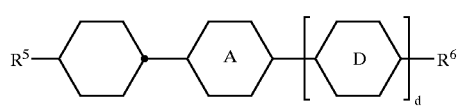

IV in which $R^5$ and $R^6$, independently of one another, are as defined for $R^1$ in the formula I,

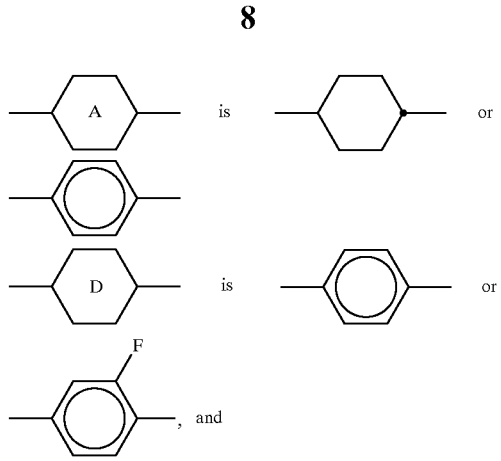

d is 0 or 1.

The compounds of the formula IV are preferably selected from the following formulae:

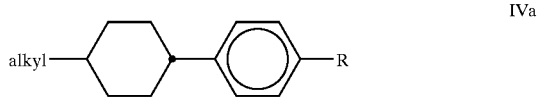

IVa

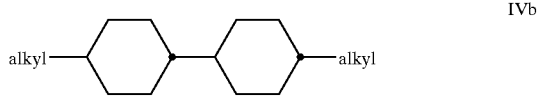

IVb

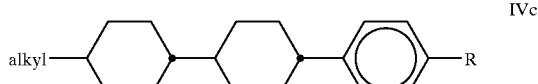

IVc

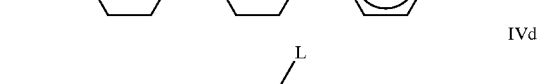

IVd

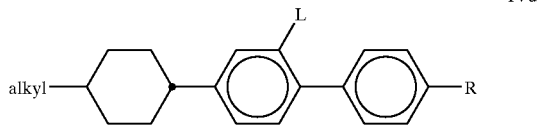

in which alkyl is $C_{1-6}$-alkyl, R is $C_{1-6}$-alkyl or -alkoxy, and L is H or F.

c) Medium which additionally comprises one or more compounds selected from the formulae Va to Vd:

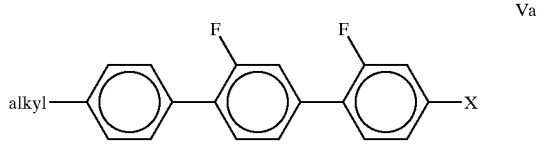

Va

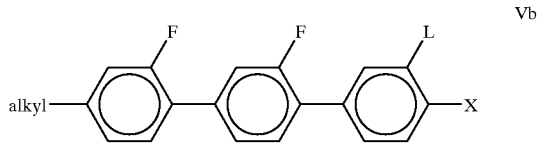

Vb

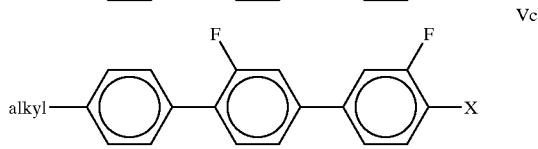

Vc

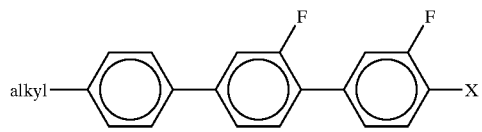
Vd in which alkyl is $C_{1-6}$-alkyl, L is H or F, and X is F or Cl. Particular preference is given to compounds of the formula Va in which X is F.

d) Medium which additionally comprises one or more compounds selected from the formulae VIa and VIb:

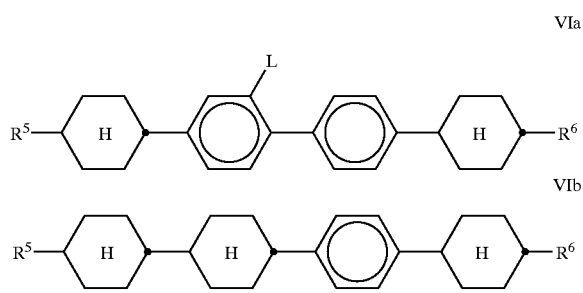

VIa

VIb in which $R^5$ and $R^6$, independently of one another, are as defined for $R^1$ in the formula I, and L is H or F. $R^5$ and $R^6$ in these compounds are particularly preferably $C_{1-6}$-alkyl or -alkoxy.

e) Medium which additionally comprises one or more compounds selected from the following formulae:

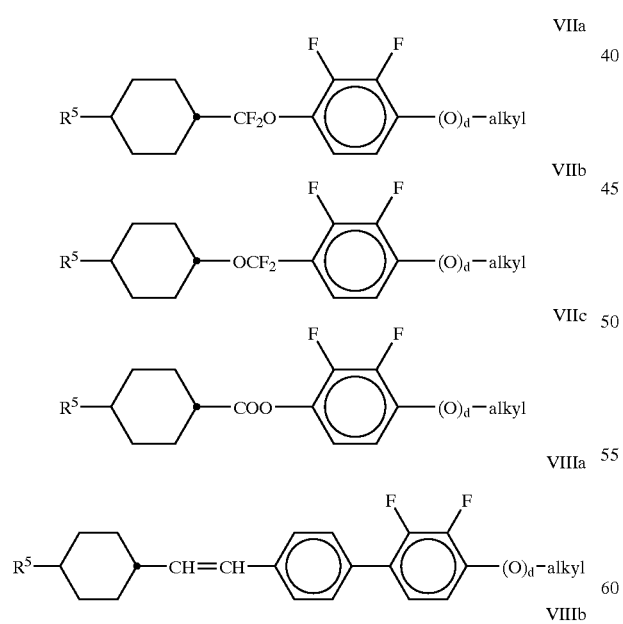

VIIa

VIIb

VIIc

VIIIa

VIIIb

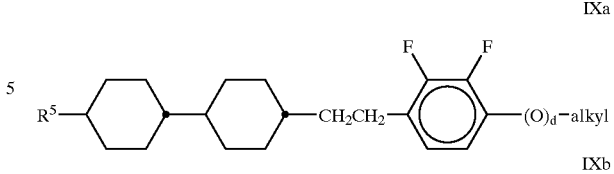

IXa

IXb

IXc

Xa

Xb

XIa

XIb

XIc in which $R^5$ and alkyl are as defined above, and d is 0 or 1. $R^5$ in these compounds is particularly preferably $C_{1-6}$-alkyl or -alkoxy, d is preferably 1. Particular preference is given to compounds of the formulae VIIc, IXb and Xb.

f) Medium which additionally comprises one or more compounds of the formula XII:

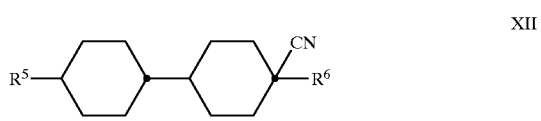

XII in which $R^5$ and $R^6$ are as defined above and are preferably alkyl having from 1 to 8 carbon atoms.

g) Medium which additionally comprises one or more compounds of the formula XIII:

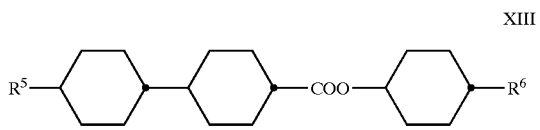

XIII in which $R^5$ and $R^6$ are as defined above and are preferably alkyl having from 1 to 8 carbon atoms.

h) Medium which comprises from 1 to 4, preferably 1 or 2, compounds of the formula I, from 1 to 6, preferably 1, 2, 3 or 4, compounds of the formula II and from 1 to 3, preferably 1 or 2, polymerizable compounds.

i) Medium which essentially consists of from 1 to 4 compounds of the formula I, from 1 to 6 compounds of the formula II, from 1 to 5 compounds of the formula IV and 1 or 2 polymerizable compounds.

k) Medium which comprises from 1 to 3, preferably 1 or 2, polymerizable compounds of the formula I*, in particular I*a, I*b or I*c.

l) Medium in which the proportion of compounds of the formula I in the mixture as a whole is from 5 to 60%, preferably from 10 to 40%. The content of the individual compounds of the formula I is preferably in each case from 2 to 20%.

m) Medium in which the proportion of compounds of the formula II in the mixture as a whole is from 10 to 70%, preferably from 15 to 60%. The content of the individual compounds of the formula II is preferably in each case from 2 to 16%.

n) Medium in which the proportion of compounds of the formula III in the mixture as a whole is from 2 to 60%, preferably from 5 to 50%. The content of the individual compounds of the formula III is preferably in each case from 2 to 15%.

o) Medium in which the proportion of compounds of the formulae IV and XIII in the mixture as a whole is from 5 to 70%, preferably from 10 to 60%.

p) Medium in which the proportion of polymerizable compounds in the mixture as a whole is from 0.05 to 10%, preferably from 0.1 to 1%.

q) Medium which essentially consists of
15–60% of one or more compounds of the formula I,
20–60% of one or more compounds of the formula II,
20–50% of one or more compounds of the formula IV, and
0.1–2% of one or more polymerizable compounds of the formula I*.

The liquid-crystal mixture preferably has a nematic phase range of at least 80 K, particularly preferably of at least 100 K, and a rotational viscosity of not more than 250 mPa·s, preferably not more than 200 mPa·s.

The liquid-crystal mixture according to the invention has a dielectric anisotropy Δε of from about −0.5 to −7.5, in particular from about −2.8 to −5.5, at 20° C. and 1 kHz.

The birefringence Δn in the liquid-crystal mixture is preferably less than 0.15, particularly preferably between 0.06 and 0.14, in particular between 0.07 and 0.12.

The dielectrics may also comprise further additives known to the person skilled in the art and described in the literature. For example, from 0 to 15% by weight of pleochroic dyes may be added, furthermore conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249–258 (1973)), may be added in order to improve the conductivity, or substances may be added inb order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the formulae I to XIII and I* of the liquid-crystal mixtures according to the invention are either known or the methods for their preparation can readily be derived from the prior art by the person skilled in the relevant art since they are based on standard processes described in the literature.

Corresponding compounds of the formulae I and II are described, for example, in EP 0 364 538.

Corresponding compounds of the formula IV are described, for example, in EP 0 122 389, DE 26 36 684 and DE 33 21 373.

Besides the compounds of the formulae I to XIII, other constituents may also be present, for example in an amount of up to 45% by weight of the mixture as a whole, but preferably up to a maximum of 35% by weight, in particular up to a maximum of 10% by weight.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acids.

Other important compounds which are suitable as constituents of liquid-crystal mixtures of this type can be characterized by the formula XIV $$R^8\text{-L-G-E-}R^9 \qquad \text{XIV}$$

in which
L and E are each a carbocyclic or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G is

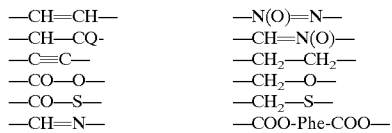

or a C—C single bond,
Q is halogen, preferably chlorine, or CN, and
$R^8$ and $R^9$ are each, independently of one another, alkyl, alkoxy, alkanoyloxy or alkoxycarbonyloxy having up to 18, preferably up to 8, carbon atoms, or one of these radicals is alternatively CN, NC, $NO_2$, $CF_3$, F, Cl or Br.

In most of these compounds, $R^8$ and $R^9$ are different from one another, one of these radicals usually being an alkyl or alkoxy group. Other variants of the proposed substituents are also common. Many such substances or also mixtures thereof are also commercially available. All these substances can be prepared by methods known from the literature.

It goes without saying to the person skilled in the art that the LC mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP A 0 240 379.

The following examples are intended to explain the invention without limiting it. Above and below, percentages are per cent by weight, unless stated otherwise; all temperatures are given in degrees Celsius.

The following abbreviations are used:

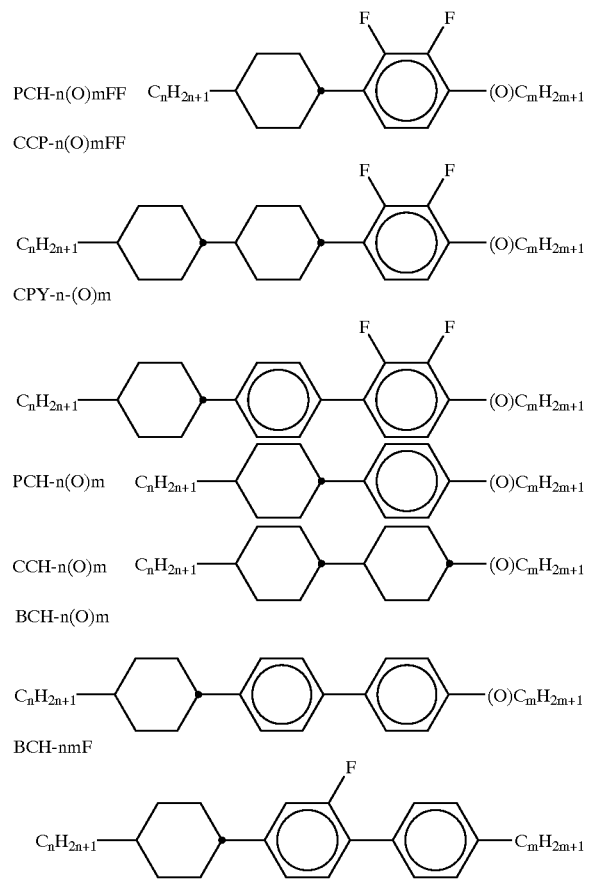

furthermore:
cl.p. clearing point [° C.]
$\Delta n$ optical anisotropy (birefringence) at 20° C. and 589 nm
$\Delta \epsilon$ dielectric anisotropy at 20° C. and 1 kHz
$\epsilon_\parallel$ dielectric constant parallel to the director at 20° C. and 1 kHz
$K_3/K_1$ ratio of the elastic constants $K_3$ and $K_1$
$\gamma_1$ rotational viscosity [mPa·s] (at 20° C., unless stated otherwise)
$V_0$ capacitive threshold voltage [V]
response time in msec The display used for measurement of the capacitive threshold voltage has two plane-parallel outer plates at a separation of 20 μm and electrode layers with overlying alignment layers of rubbed polyimide on the insides of the outer plates, which effect a homeotropic edge alignment of the liquid-crystal molecules.

The polymerizable compounds are polymerized in the display by UV irradiation with a strength of 28 mW/cm² and a duration of about 2 minutes, with a voltage simultaneously being applied to the display.

The electro-optical measurements are carried out with transmissive illumination (DMS 703 measurement system) at 20° C.

The entire disclosure[s] of all applications, patents and publications, cited herein and of corresponding German Patent Application No. 102 30 597.8 filed Jul. 6, 2002 are incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLE 1

The nematic liquid-crystal mixture N1 is formulated as follows:

| | | | |
|---|---|---|---|
| PCH-302FF | 16.00% | cl.p. | +71.0 |
| PCH-502FF | 14.00% | $\Delta n$ | 0.0822 |
| CCP-302FF | 12.00% | $\Delta \epsilon$ | −3.8 |
| CCP-502FF | 11.00% | $\epsilon_\parallel$ | 3.6 |
| CCP-21FF | 9.00% | $K_3/K_1$ | 1.15 |
| CCP-31FF | 8.00% | $\gamma_1$ | 133 |
| CCH-34 | 8.00% | $V_0$ | 2.10 |
| CCH-35 | 9.00% | | |
| PCH-53 | 7.00% | | |
| PCH-301 | 6.00% | | |

The polymerizable compounds A and B are each melted with 2.1% of the UV photoinitiator Irgacure 651 (commercially available from Ciba AG). Mixtures P1A and P1B are formulated by addition of 0.5% of this melt to N1. As an alternative, the polymerizable compound A or B, the photoinitiator and N1 are weighed out together and formulated to give P1A and P1B.

| | N1 | A | B | Irg 651 |
|---|---|---|---|---|
| P1A | 99.5% | 0.49% | — | 0.01% |
| P1B | 99.5% | — | 0.49% | 0.01% |

$$CH_2=CH-COO-\underset{A}{\bigcirc\!\!\!-\!\!\!\bigcirc}-OCO-CH=CH_2$$

$$CH_2=CH-COO-\underset{B}{\bigcirc}-OCO-CH=CH_2$$

Standard VA displays are filled with mixtures N1, P1A and P1B, and the tilt angle and the voltage holding ratio (HR) are measured before and after UV irradiation. The result is shown in Table 1.

TABLE 1

HR and tilt angle of mixtures N1, P1A and P1B before and after UV irradiation

| | VHR (5 min/100° C.) | | Tilt [°] at various voltages after 2 min UV at 28 mW/cm$^2$ | | | |
|---|---|---|---|---|---|---|
| | before UV | after 2 min 28 mW/cm$^2$ | 0 V | 2.5 V | 5 V | 10 V |
| N1 | 93.6 | 94.4 | 89.9 | 89.9 | 89.9 | 89.9 |
| P1A | 93.7 | 92.9 | 89.8 | 87.5 | 83.5 | 82.0 |
| P1B | 93.1 | 94.1 | 89.6 | 88.1 | 84.9 | 81.5 |

After polymerization, a clear deviation of the tilt angle from the previous ~89–90° has been achieved in mixtures P1A and P1B compared with N1, depending on the voltage applied during the polymerization (setting of a pretilt angle). Table 1 furthermore shows that the holding ratio values of P1A and P1B are not lowered by addition of the polymerizable compound A or B compared with mixture N1 without polymerizable compound.

EXAMPLE 2

Nematic liquid-crystal mixtures N2, N3 and N4 are formulated as follows:

| N2: | | | |
|---|---|---|---|
| PCH-302FF | 12.00% | cl.p. | +90.0 |
| PCH-502FF | 12.00% | Δn | 0.0830 |
| CCP-302FF | 14.00% | Δε | −4.2 |
| CCP-502FF | 13.00% | ε$_\parallel$ | 3.6 |
| CCP-21FF | 13.00% | K$_3$/K$_1$ | 1.08 |
| CCP-31FF | 12.00% | γ$_1$ | 186 |
| CCH-34 | 6.00% | V$_0$ | 2.17 |
| CCH-35 | 6.00% | | |
| CCH-303 | 8.00% | | |
| CCH-501 | 4.00% | | |

| N3: | | | |
|---|---|---|---|
| PCH-302FF | 12.00% | cl.p. | +79.5 |
| PCH-502FF | 13.00% | Δn | 0.0996 |
| CCP-302FF | 11.00% | Δε | −3.1 |
| CCP-502FF | 10.00% | ε$_\parallel$ | 3.5 |
| CCP-21FF | 9.00% | K$_3$/K$_1$ | 1.13 |
| BCH-32 | 6.00% | γ$_1$ | 148 |
| BCH-52 | 4.00% | V$_0$ | 2.45 |
| BCH-32F | 6.00% | | |
| CCH-34 | 6.00% | | |
| CCH-35 | 6.00% | | |
| PCH-302 | 17.00% | | |

| N4: | | | |
|---|---|---|---|
| PCH-304FF | 16.00% | cl.p. | +70.0 |
| PCH-502FF | 16.00% | Δn | 0.1023 |
| CCP-302FF | 13.00% | Δε | −4.8 |
| CCP-502FF | 3.00% | ε$_\parallel$ | 4.0 |
| CPY-2-O2 | 13.00% | K$_3$/K$_1$ | 1.15 |
| CPY-3-O2 | 11.50% | γ$_1$ | 166 |
| CCH-35 | 8.50% | V$_0$ | 1.83 |
| PCH-301 | 14.00% | | |
| CCH-501 | 5.00% | | |

Polymerizable compound A is melted with 2.1% of Irgacure 651. Mixtures P2–P4 are formulated by addition of 0.5% of this melt to N2–N4:

| | N2 | N3 | N4 | A | Irg 651 |
|---|---|---|---|---|---|
| P2 | 99.5% | — | — | 0.49% | 0.01% |
| P3 | — | 99.5% | — | 0.49% | 0.01% |
| P4 | — | — | 99.5% | 0.49% | 0.01% |

Standard VA displays are filled with mixtures N1, P1A and P1B from Example 1 and mixtures N2–N4 and P2–P4, irradiated for 2 minutes with UV light (28 mW/cm$^2$) under an applied voltage of 10 volts, and their electro-optical properties are then measured. The result is shown in Table 2.

TABLE 2

Electro-optical properties of N1–N4 and P1A–P4

| | N1 | P1A | P1B | N2 | P2 | N3 | P3 | N4 | P4 |
|---|---|---|---|---|---|---|---|---|---|
| Δn | 0.0822 | 0.0822 | 0.0822 | 0.083 | 0.083 | 0.0996 | 0.0996 | 0.1023 | 0.1023 |
| d [μm]$^{1)}$ | 4.0 | 4.0 | 4.0 | 4.0 | 4.0 | 3.3 | 3.3 | 3.2 | 3.2 |
| d*Δn | 0.33 | 0.33 | 0.33 | 0.33 | 0.33 | 0.33 | 0.33 | 0.33 | 0.33 |
| tilt [°] | 89.5 | 85.0 | 84.5 | 89.8 | 83.7 | 89.2 | 83.9 | 89.6 | 82.9 |
| V10 [V] | 2.57 | 2.35 | 2.34 | 2.63 | 2.36 | 2.95 | 2.73 | 2.22 | 1.95 |
| V25 [V] | 2.78 | 2.58 | 2.59 | 2.82 | 2.62 | 3.17 | 3.00 | 2.39 | 2.19 |
| V50 [V] | 3.29 | 3.12 | 3.21 | 3.33 | 3.22 | 3.77 | 3.68 | 2.85 | 2.76 |
| V90 [V] | 4.85 | 4.6 | 4.84 | 4.66 | 4.68 | 5.44 | 5.39 | 4.19 | 4.45 |
| τ [ms] V0–V90 | 30 | 22 | 21 | 40 | 25 | 13 | 12 | 19 | 15 |
| τ [ms] V25–V50 | 59 | 52 | 47 | 64 | 61 | 36 | 29 | 42 | 33 |

$^{1)}$d = layer thickness of the LC medium

The threshold voltages of mixtures P1A–P4 with polymerized compounds are reduced in all examples compared with the respective starting mixture N1–N4. Furthermore, all response times, in particular also the grey-shade response times (shown through the example of V25–V50) were significantly reduced.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium, which comprises: one or more compounds of the formula I

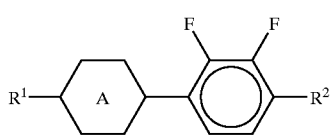

one or more compounds of the formula II

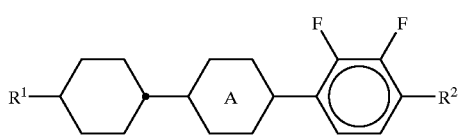

wherein $R^1$ and $R^2$ are each, independently of one another, alkyl having from 1 to 12 carbon atoms, in which one or two non-adjacent $CH_2$ groups are optionally replaced by —O—, —CO—, —OCO— or —COO— in such a way that O atoms are not linked directly to one another, and

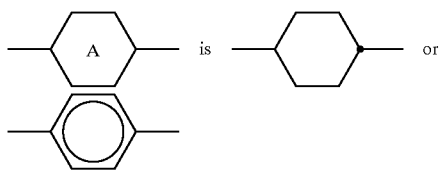

and one or more polymerizable compounds selected from those of the formula I*

$$P^1\text{-}Sp^1\text{-}X^1\text{-}A^1\text{-}(Z^1\text{-}A^2)_n\text{-}R \qquad I^*$$

in which

R is H, F, Cl, CN, SCN, $SF_5H$, $NO_2$, straight-chain or branched alkyl having from 1 to 12 carbon atoms, in which one or two non-adjacent $CH_2$ groups are optionally replaced by —O—, —S—, —CO—, —OCO—, —COO—, —O—COO—, —S—CO—, —CO—S—, —CH=CH— or —C≡C— in such a way that O and/or S atoms are not linked directly to one another, or R is —$X^2$-$Sp^{2\text{-}P2}$, $P^1$ and $P^2$ are each, independently of one another, acrylate, methacrylate or epoxy, $Sp^1$ and $Sp^2$ are each, independently of one another, a spacer group or a single bond, $X^1$ and $X^2$ are each, independently of one another, —O—, —S—, —$OCH_2$—, —$CH_2O$—, —CO—, —COO—, —OCO—, —OCO—O—, —CO—$NR^0$—, —$NR^0$—CO—, —$OCH_2$—, —$CH_2O$—, —$SCH_2$—, —$CH_2S$—, —CH=CH—COO—, —OOC—CH=CH— or a single bond.

$A^1$ and $A^2$ are each, independently of one another, 1,4-phenylene, in which one or more CH groups are optionally replaced by N; 1,4-cyclohexylene, in which one or more non-adjacent $CH_2$ groups are optionally replaced by O and/or S; 1,4-cyclohexenylene; 1,4-bicyclo[2.2.2]octylene; piperidine-1,4-diyl; naphthalene-2,6-diyl; decahydronaphthalene-2,6-diyl; 1,2,3,4-tetrahydronaphthalene-2,6-diyl; or indane-2,5-diyl; where all these groups may be unsubstituted or monosubstituted or polysubstituted by L, L is F, Cl, CN or alkyl, alkoxy, alkylcarbonyl, alkoxycarbonyl or alkylcarbonyloxy having from 1 to 7 carbon atoms, in which one or more H atoms are optionally replaced by F or Cl, $Z^1$ is —O—, —S—, —CO—, —COO—, —OCO—, —O—COO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CF—, —C≡C—, —CH=CH—COO—, —OCO—CH=CH—, $CR^0R^{00}$ or a single bond, $R^0$ and $R^{00}$ are each, independently of one another, H or alkyl having from 1 to 4 carbon atoms, and n is 0, 1 or 2.

2. A liquid-crystalline medium, which comprises:

one or more compounds of the formula I

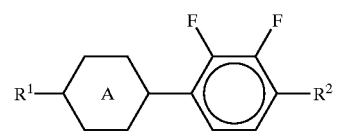

one or more compounds of the formula II

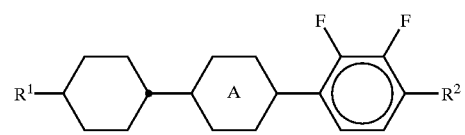

wherein $R^1$ and $R^2$ are each, independently of one another, alkyl having from 1 to 12 carbon atoms, in which one or two non-adjacent $CH_2$ groups are optionally replaced by —O—, —CH=CH—, —CO—, —OCO— or —COO— in such a way that O atoms are not linked directly to one another, and

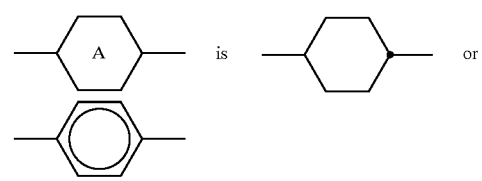

and, one or more polymerizable compounds selected from those of the following formulae:

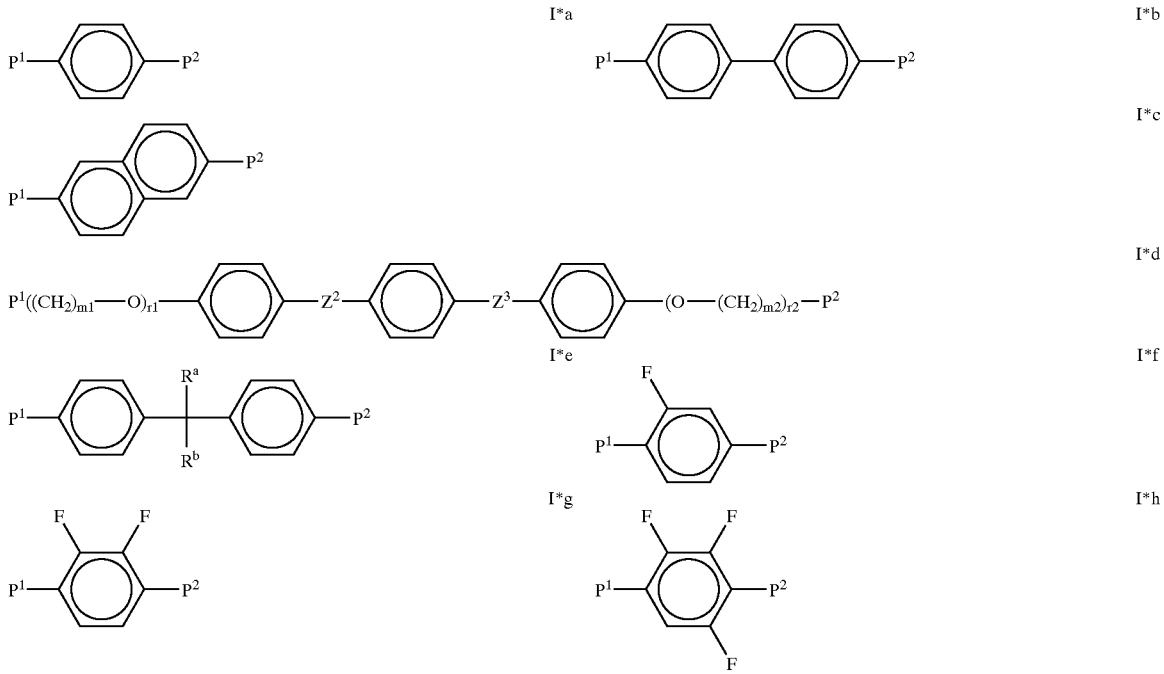

in which P¹ and P² are each, independently of one another, a polymerizable group, $Z^2$ and $Z^3$ are each, independently of one another, —O—, —S—, —CO—, —COO—, —OCO—, —O—COO—, —OCH₂—, —CH₂O—, —SCH₂—, —CH₂S—, —CF₂O—, —OCF₂—, —CF₂S—, —SCF₂—, —CH₂CH₂—, —CF₂CH₂—, —CH₂CF₂—, —CF₂CF₂—, —CH=CH—, —CF=CF—, —C≡C—, —CH=CH—COO—, —OCO—CH=CH—, $CR^0R^{00}$ or a single bond, where $R^0$ and $R^{00}$ are each, independently of one another, H or alkyl having from 1 to 4 carbon atoms, m1 and m2 are each, independently of one another, from 1 to 8, r1 and r2 are each, independently of one another, 0 or 1, and $R^a$ and $R^b$ are each, independently of one another, H or CH₃.

3. Medium according to claim 2, wherein P¹ and P² are independently acrylate, methacrylate, vinyl, vinyloxy, propenyl ether or epoxy.

4. Medium according to claim 1, wherein the compounds of the formulae I are selected from those of formulae Ia and Ib and the compounds of formula II are selected from those of the formulae IIa–IId:

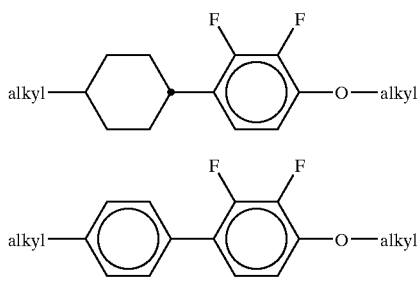

-continued

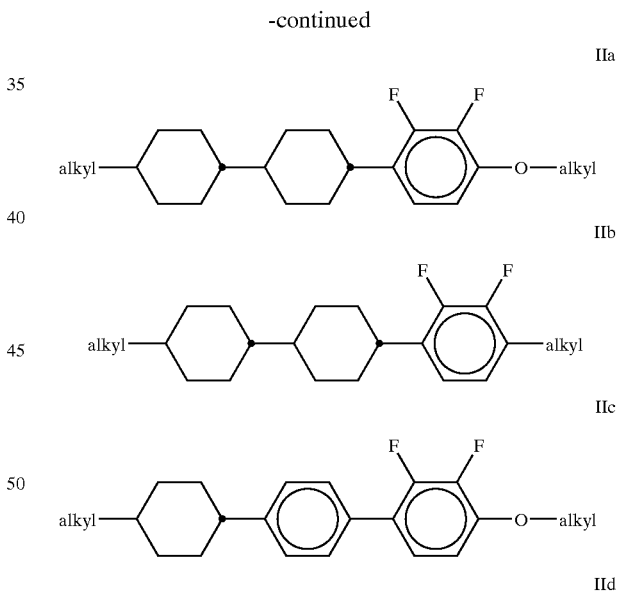

in which alkyl is $C_{1-6}$-alkyl.

5. Medium according to claim 2, wherein the compounds of the formulae I are selected from those of formulae Ia and Ib and the compounds of formula II are selected from those of the formulae IIa–IId:

Ia
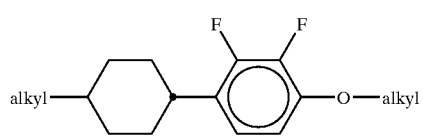

Ib
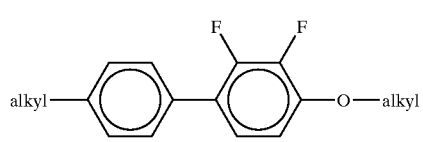

IIa
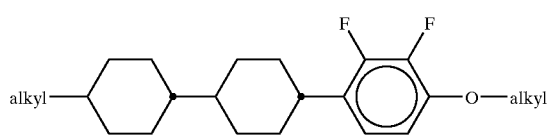

IIb
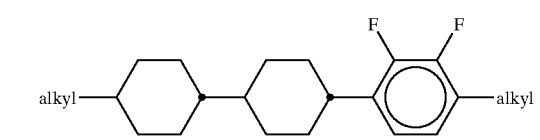

IIc
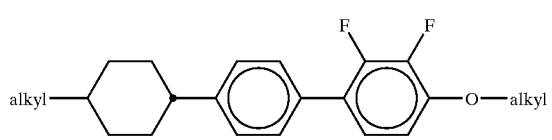

IId
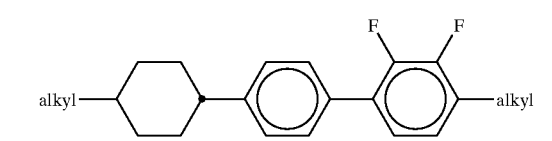

in which alkyl is $C_{1-6}$-alkyl.

6. Medium according to claim 1, which additionally comprises one or more compounds of the formula III:

III
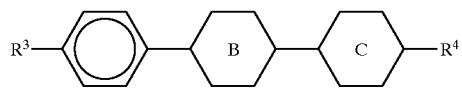

in which $R^3$ and $R^4$, independently of one another, are as defined for $R^1$, and

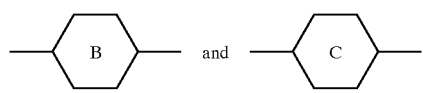

are each, independently of one another,

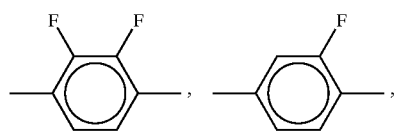

-continued

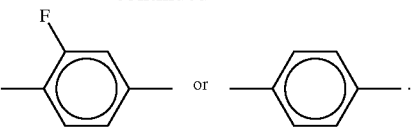

7. Medium according to claim 2, which additionally comprises one or more compounds of the formula III:

III
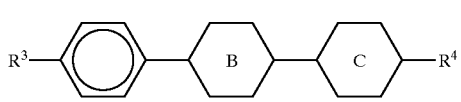

in which $R^3$ and $R^4$, independently of one another, are as defined for $R^1$, and

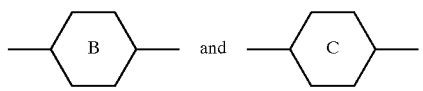

are each, independently of one another,

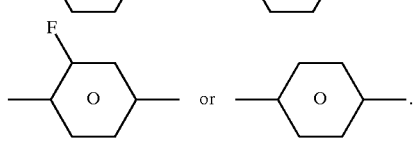

8. Medium according to claim 1, which additionally comprises one or more compounds of the formula IV:

IV
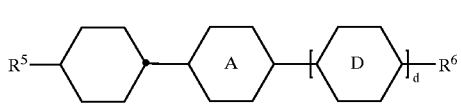

in which $R^5$ and $R^6$, independently of one another, are as defined for $R^1$,

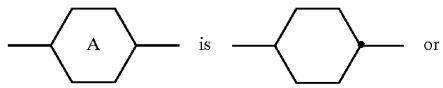

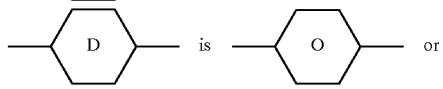

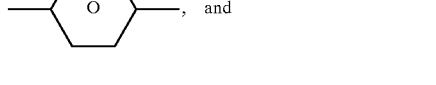

d is 0 or 1.

9. Medium according to claim 2, which additionally comprises one or more compounds of the formula IV:

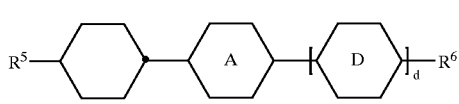

IV in which
R$^5$ and R$^6$, independently of one another, are as defined for R$^1$,

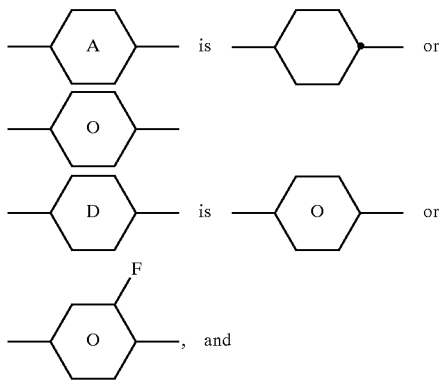

d is 0 or 1.

10. Medium according to claim 8, which consists essentially of:
    from 1 to 4 compounds of the formula I, from 1 to 6 compounds of the formula II, from 1 to 5 compounds of the formula IV and 1 or 2 polymerizable compounds of formula I*.

11. Medium according to claim 8, which consists essentially of:
    15–60% by weight of one or more compounds of the formula I,
    20–60% by weight of one or more compounds of the formula II,
    20–50% by weight of one or more compounds of the formula IV, and
    0.1–2% by weight of one or more polymerizable compounds of the formula I*.

12. An electro-optical display having active-matrix addressing, which comprises, as dielectric, a liquid-crystalline medium according to claim 1.

13. An electro-optical display having active-matrix addressing, which comprises, as dielectric, a liquid-crystalline medium according to claim 2.

14. An electro-optical display having active-matrix addressing, which comprises, as dielectric, a liquid-crystalline medium according to claim 8.

15. An electro-optical display having active-matrix addressing, which comprises, as dielectric, a liquid-crystalline medium according to claim 11.

16. An electro-optical display according to claim 12, which display is based on the ECB, VA, MVA, PVA, DAP or CSH effect.

17. An electro-optical display according to claim 15, which display is based on the ECB, VA, MVA, PVA, DAP or CSH effect.

18. Medium according to claim 9, which consists essentially of:
    from 1 to 4 compounds of the formula I, from 1 to 6 compounds of the formula II, from 1 to 5 compounds of the formula IV and 1 or 2 polymerizable compounds of formulae I*a to I*h.

19. Medium according to claim 9, which consists essentially of:
    15–60% by weight of one or more compounds of the formula I,
    20–60% by weight of one or more compounds of the formula II,
    20–50% by weight of one or more compounds of the formula IV, and
    0.1–2% by weight of one or more polymerizable compounds of the formulae I*a to I*h.

20. An electro-optical display having active-matrix addressing, which comprises, as dielectric, a liquid-crystalline medium according to claim 9.

21. An electro-optical display having active-matrix addressing, which comprises, as dielectric, a liquid-crystalline medium according to claim 19.

22. An electro-optical display according to claim 13, which display is based on the ECB, VA, MVA, PVA, DAP or CSH effect.

23. An electro-optical display according to claim 21, which display is based on the ECB, VA, MVA, PVA, DAP or CSH effect.

* * * * *

UNITED STATES PATENT AND TRADEMARK OFFICE
CERTIFICATE OF CORRECTION

PATENT NO. : 6,861,107 B2
DATED : March 1, 2005
INVENTOR(S) : Matthias Bremer

It is certified that error appears in the above-identified patent and that said Letters Patent is hereby corrected as shown below:

Column 17,
Line 63, delete "$^{p2}$" and insert -- $-P^2$ --

Column 18,
Line 6, delete "." and insert -- , --

Column 19,
Line 33, delete "$-OCH_2$" and insert -- $-OCH_2$ --

Column 20,
Line 67, delete "formulae" and insert -- formula --

Signed and Sealed this

Ninth Day of August, 2005

JON W. DUDAS
*Director of the United States Patent and Trademark Office*